United States Patent Office 2,952,564
Patented Sept. 13, 1960

2,952,564

PROTECTIVE COATING COMPOSITION CONTAINING (1) A VOLATILE NITROGENOUS BASE SALT OF AN INTERPOLYMER OF A CONJUGATED 1,3-DIENE AND ACRYLIC OR METHACRYLIC ACID AND (2) A WATER-SOLUBLE AMINOPLAST RESIN AND METHOD OF PROTECTING STEEL THEREWITH

Nello R. Traverso, West Springfield, Mass., assignor to Monsanto Chemical Company, St. Louis, Mo., a corporation of Delaware No Drawing. Filed Feb. 10, 1956, Ser. No. 564,611

9 Claims. (Cl. 117—75)

The present invention relates to water base protective coating compositions and to methods for protecting solid surfaces therewith. More particularly, the present invention relates to protective coating compositions containing as the film former and pigment binder an aqueous solution of both a high molecular weight addition type polymer and a water-soluble aminoplast.

The development of water base protective coating compositions is an object of long standing in the protective coating art. The advantages of depositing a protective coating from compositions employing water as the vehicle are obvious from the viewpoint of both economy and safety. To date, however, the art has not developed satisfactory compositions employing a water-soluble material as the film former and pigment binder. The use of latexes of water-insoluble polymers as pigment binders is widespread, but it is recognized that there are inherent shortcomings in such compositions. The films deposited from a latex consists essentially of individual spheres of the emulsified polymer joined to each other only in so far as the spheres are soft enough to flatten, contact and merge in a sintering effect. Inherently, a compromise must be made between a polymer that is too soft to give a durable film and a polymer that is too hard to give an adhesive and cohesive sintered type continuity. In addition, the sintered ball continuum is an inefficient means for covering a solid surface with a uniformly dense, strongly adherent pigmented film.

It is an object of this invention to provide novel water base protective coating compositions.

Another object of this invention is to provide a method for depositing protective coatings on solid surfaces from novel water base protective coating compositions.

Other objects and advantages of this invention will become apparent from the following detailed description thereof.

In accordance with this invention there are provided novel water base protective coating compositions and an improved method for depositing protective coatings on solid surfaces from such compositions. The protective coating compositions of this invention comprise an aqueous solution containing as the essential film-forming polymers (1) 10–90 parts of water-soluble salt formed between a volatile nitrogenous base and an interpolymer consisting essentially of a conjugated 1,3-diene and an acidic monomer of the group consisting of acrylic acid, methacrylic acid and mixtures thereof and (2) 90–10 parts of a water-soluble aminoplast of the group consisting of (a) water-soluble formaldehyde condensates of urea, thiourea, aminotriazines and mixtures thereof and (b) water-soluble ethers of such formaldehyde condensates. Protective coatings are prepared by applying the protective coating composition to the surface to be protected and heating to evaporate water from the film and inter-react the two film-forming resins. The protective coatings thus obtained are remarkably hard and have excellent resistance to water and most classes of organic solvents. The coatings have good color and unpigmented films are essentially water white.

The following examples are set forth to illustrate more clearly the principle and practice of this invention to those skilled in the art. Unless otherwise noted, all parts are by weight.

EXAMPLE I

A butadiene-methacrylic acid interpolymer is prepared by an emulsion polymerization technique employing the following recipe:

| Component: | Parts |
| --- | --- |
| Butadiene | 50 |
| Methacrylic acid | 50 |
| Potassium persulfate | 1.0 |
| Emulsifiers | 5.0 |
| Dodecyl mercaptan | 1.0 |
| Water | 200 |

The polymerization is carried out for 74 hours at 50° C. and a conversion of about 95% is obtained.

Concentrated ammonium hydroxide in stoichiometric excess of the methacrylic acid contained in the polymer is added to the latex. The interpolymer initially coagulates, but then dissolves in the ammonium hydroxide solution. The solution is diluted to 15 weight percent solids.

EXAMPLE II

*Part A*

A protective coating composition is prepared by admixing a water-soluble methyl ether of methylol melamine with the aqueous solution of the ammonium salt of the butadiene-methacrylic acid interpolymer prepared in Example I. The proportion of the methyl ether of methylol melamine added is such as to constitute 25 weight percent of the combined polymers. The composition is diluted to approximately 17 weight percent solids.

The methyl ether of methylol melamine employed in this example is a commercial product containing substantially three methylol groups per mol of melamine and approximately 70% of the methylol groups are etherified. The product is prepared under conditions such that substantially all of it is obtained in the monomeric form.

*Part B*

Part A of this example is repeated except that the quantity of methyl ether of methylol melamine incorporated in the composition is sufficient to constitute 50 weight percent of the combined polymers.

*Part C*

Part A of this example is repeated except that the quantity of the methyl ether of methylol melamine incorporated in the composition is sufficient to constitute 75 weight percent of the combined polymers.

EXAMPLE III

*Part A*

A protective coating composition of approximately 17 weight percent of solids is prepared by admixing a water-soluble, partially polymerized urea-formaldehyde resin with the aqueous solution of the ammonium salt of the butadiene-methacrylic acid interpolymer prepared in Example I. The proportion of the urea-formaldehyde resin included in the composition is sufficient to constitute 50 weight percent of the combined polymers.

The partially polymerized urea-formaldehyde resin is a commercially available product that is sold as an approximately 65% solids aqueous solution. The product is stabilized by including therein a small proportion ethanol and ethylene glycol.

Part B

Part A of this example is repeated except that the proportion of the urea-formaldehyde resin included in the composition is sufficient to constitute 75 weight percent of the combined polymers.

EXAMPLE IV

Glass slides are coated with the protective coating compositions of Example II, Parts A, B and C, and the coatings are baked for 20 minutes at 300° F. The dry films are about 0.6 mil thick. The solvent resistance of the coatings is measured by placing two drops of solvent on the film and observing the film after 10 minutes for any softening, peeling or other deterioration. The coatings show excellent resistance to xylene, Varsol and water with no deterioration of the film being observed.

The coatings show very good resistance to alcohol with only incipient softening of the film being observed. The resistance of the film to alcohol is substantially higher than that of corresponding films prepared from protective coating compositions based on either of the individual film formers included in the composition. In addition to their resistance to solvents, each of the films is very hard and durable. The films are transparent throughout the visible spectrum.

EXAMPLE V

A film of the composition of Example II, Part A, is cast on a highly polished nickel plated steel sheet and the coating is baked for 20 minutes at 300° F. The film is not damaged by soaking for seven days in an 0.5% solution of a highly alkaline proprietary home-laundry detergent.

EXAMPLE VI

Glass slides are coated with the protective coating compositions of Example III, Parts A and B and the coatings are baked for 20 minutes at 300° C. The solvent resistance of coatings is measured as described in Example IV and substantially comparable results are obtained.

The protective coating compositions of the invention contain as the film former and pigment binder an aqueous solution of both (1) a water-soluble salt formed between a volatile nitrogenous base and an interpolymer consisting essentially of a conjugated 1,3-diene and an acidic monomer of the group consisting of acrylic acid, methacrylic acid and mixtures thereof, and (2) a water-soluble aminoplast of the group consisting of (a) water-soluble formaldehyde condensates of urea, thiourea, aminotriazines and mixtures thereof, and (b) water-soluble ethers of such formaldehyde condensates. In the preparation of the salt of the interpolymer of the conjugated 1,3-diene and the acidic monomer it is general practice to employ the volatile nitrogenous base in stoichiometric excess of the carboxyl groups present in the interpolymer. For this reason, in nearly all cases, the protective coating compositions of this invention will be alkaline, i.e., have a pH of greater than 7.

The volatile nitrogenous bases employed in preparing the salts of the interpolymers of conjugated 1,3-dienes and acidic monomers are those having atmospheric boiling points not substantially higher than about 175° C. Ammonia is the preferred volatile nitrogenous base for use in this invention, but it is also possible to employ other volatile amines such as methylamine, dimethylamine, trimethylamine, the mono-, di- and triethylamines, isopropylamine, butylamine, ethanolamine, morpholine, pyridine, etc.

The interpolymers whose nitrogenous base salts are employed in this invention are interpolymers of a conjugated 1,3-diene and acrylic acid, methacrylic acid or a mixture of these acids. Butadiene is the conjugated 1,3-diene most frequently employed, but other conjugated 1,3-dienes such as isoprene, piperylene, 2,3-dimethylbutadiene, etc. also may be employed. While it is frequently preferred to employ interpolymers containing only a conjugated 1,3-diene and the acidic monomer, it is possible to include in the interpolymers other interpolymerizable vinyl monomers such as vinyl mono-aromatic compounds, e.g., styrene, vinyl toluene, o-chlorostyrene, p-chlorostyrene, 2,4-dichlorostyrene, p-ethylstyrene, 2,5-dimethylstyrene, 2-methyl-4-chlorostyrene, alpha-methylstyrene; acrylate and methacrylate esters, e.g., methyl acrylate, ethyl acrylate, 2-ethylhexyl acrylate, methyl methacrylate; acrylamide; acrylonitrile; methacrylamide; methacrylonitrile; etc.

The proportion of the acidic monomer included in the interpolymer must be sufficient to render the interpolymer soluble in aqueous solutions when the interpolymer is converted into a salt by reaction with volatile nitrogenous bases of the type previously described. The precise quantity of acidic monomer required may vary considerably and is dependent upon such factors as: (1) the comonomers included in the interpolymer and the relative proportions of the comonomers when three or more monomers are included in the interpolymer, (2) the molecular weight of the interpolymer and (3) the gel content or degree of cross-linking in the interpolymer. A minimum of approximately 15 mol percent of the acidic monomer is usually required although in some cases, as where the interpolymer has a high gel content, up to about 50 mol percent of the acidic monomer may be required. In general, the acidic monomer content should not be sufficiently high to render the interpolymer soluble in water and should never exceed more than about 70 mol percent of the interpolymer. The preferred acidic monomer content of the interpolymers is from about 15 mol percent to about 50 mol percent with optimum properties usually being obtained at an acidic monomer content of from about 20 mol percent to about 30 mol percent. The conjugated 1,3-diene should be present in the interpolymer to the extent of at least about 25 mol percent and preferably to the extent of at least about 35 mol percent to obtain the desirable properties which characterize the protective coating compositions of this invention. Good properties are obtained at conjugated 1,3-diene contents of up to about 85 mol percent. Where a third comonomer is included in the interpolymer, it may constitute up to about 60 mol percent of the interpolymer, but most frequently will constitute less than about 50 mol percent of the interpolymer. In many interpolymers even less than about 30 mol percent of the third monomer is included in the interpolymer.

The interpolymer of conjugated 1,3-diene and acidic monomer may be prepared by any convenient method such as by solution polymerization or by emulsion polymerization. Where the interpolymer is prepared in an aqueous emulsion, aqueous solutions of the volatile nitrogenous base salt of the interpolymer may be prepared directly by adding thereto a stoichiometric excess of a volatile nitrogenous base. The volatile nitrogenous base may cause coagulation of the interpolymer, but thereafter the interpolymer dissolves in the nitrogenous base solution.

The water-soluble aminoplasts included in the protective coating compositions of this invention are selected from the group consisting of (a) water-soluble formaldehyde condensates of urea, thiourea, aminotriazines and mixtures thereof and (b) water-soluble ethers of such formaldehyde condensates. In the description of these aminoplasts the term "water-soluble" is used to denote both aminoplasts which form true solutions, i.e., obey the chemical and physical laws of solutions, and those which merely disperse in water, but remain in such small particle sizes that they do not separate from the water phase in which they are suspended. Aminoplast dispersions of this latter class are very common and for most practical purposes are indistinguishable from true solutions. For the purposes of the present invention, an aminoplast is not considered to be water-soluble unless at least five parts thereof will dissolve in or disperse in 95 parts of water.

The water-soluble aminoplasts employed herein are prepared by condensing formaldehyde with amino compounds such as urea, thiourea, aminotriazines as exemplified by melamine, N-substituted melamines, formoguanamine, and mixtures of such amino compounds. Although melamine and N-substituted melamines such as N-alkyl melamines and N-aryl melamines are the aminotriazines of choice to be employed in preparing the water-soluble aminoplasts included in the compositions of this invention, larger numbers of other diverse types of aminotriazines also may be employed; for example, one may employ many of the aminotriazines set forth in the disclosure of U.S. 2,635,083 from the section beginning at column 7, line 9 and running through column 10, line 50.

The amino compound employed, the molar quantity of formaldehyde included in the aminoplast and the degree of polymerization of the aminoplast are all of course limited by the consideration that the aminoplast must be water-soluble to be operable in the invention. To insure optimum storage stability in the compositions of the invention, it is preferred to employ water-soluble aminoplasts that consist essentially of the monomeric methylol derivatives for urea, thiourea and aminotriazines. Ethers of the above described formaldehyde condensates may be used interchangeably therewith, provided only that the etherified product be water-soluble. Aminoplasts of the above type and the preparation thereof are well known in the art and for this reason are not described in detail herein.

The proportions of the two film-forming polymers included in the compositions of this invention may be varied widely, provided that each of the film-forming polymers is included in the composition to the extent of at least 10 weight percent of their combined weight. Obviously the properties of the compositions will vary widely depending upon the ratio of the two film-forming polymers included therein, but within the broad range of composition discussed above, it is possible to prepare protective coating compositions having properties superior to those that can be obtained from compositions containing either of the film-forming polymers as the sole film-former. In a more limited and preferred embodiment of the invention, the volatile nitrogenous base salt of the butadiene-acidic monomer interpolymer will constitute 20–75 weight percent and more especially 30–50 weight percent of the combined weight of the film-forming polymers with the water-soluble aminoplast constituting correspondingly 80–25 weight percent and more especially 70–50 weight percent of the mixture.

In addition to the two film-forming polymers previously discussed, the protective coating compositions may contain other components conventional to such compositions. In many applications one or more colorants will be included in the compositions, although as previously noted, because of their nearly complete transparency in the visual spectrum, the compositions are eminently suited for employment as unpigmented enamels, e.g., as in wire coating. Where colorants are employed, the various iron-oxide pigments, the chrome pigments, the titanium dioxide pigments, the silicate pigments, etc. are particularly suitable. Antioxidants, driers and other components also may be included in the compositions if desired.

The protective coating compositions of this invention may be applied to the surfaces to be protected by any convenient technique such as brushing, dipping, rolling, spraying, etc. For the development of optimum properties, the coatings prepared from the compositions of this invention should be baked at elevated temperatures, e.g., at 140° F. or preferably at least 200° F., for a time sufficient to inter-react the two film-forming polymers. The coatings prepared by the method of this invention, in addition to their utility as top coats in the protective coating art, form an excellent base for the application of other protective coatings such as alkyd resins, lacquers, varnishes, etc. and may be employed as primers therefor.

The above descriptions and particularly the examples are set forth by way of illustration only. Many other variations and modifications thereof can be made without departing from the spirit and scope of the invention herein disclosed.

What is claimed is:

1. A protective coating composition comprising an aqueous solution containing as the essential film-forming polymers (1) 10–90 parts of a water-soluble salt formed between a volatile nitrogenous base and an interpolymer of monomers comprising in polymerized form a conjugated 1,3-diene of the group consisting of butadiene, isoprene, piperylene and 2,3-dimethylbutadiene and an acidic monomer of the group consisting of acrylic acid, methacrylic acid and mixtures thereof, said interpolymer containing at least 25 mol percent of the conjugated 1,3-diene and 15–70 mol percent of the acidic monomer, the volatile nitrogenous base employed having an atmospheric boiling point not substantially higher than about 175° C., and (2) 90–10 parts of a water-soluble aminoplast of the group consisting of (a) water-soluble formaldehyde condensates of urea, thiourea, aminotriazines and mixture thereof and (b) water-soluble ethers of such formaldehyde condensates.

2. The compositions of claim 1 in which the water-soluble aminoplast is a methyl ether of methylol melamine.

3. The compositions of claim 1 in which the water-soluble aminoplast is a water-soluble formaldehyde condensate of urea.

4. The compositions of claim 2 in which the conjugated 1,3-diene employed in the interpolymer is butadiene.

5. The compositions of claim 4 in which the salt of the interpolymer employed is an ammonium salt.

6. The compositions of claim 5 in which the interpolymer employed contains in polymerized form a third comonomer of the group consisting of vinyl monoaromatic compounds, acrylate esters of aliphatic alcohols containing 1–8 carbon atoms, methacrylate esters of aliphatic alcohols containing 1–8 carbon atoms, acrylamide, acrylonitrile, methacrylamide and methacrylonitrile.

7. The compositions of claim 5 in which the interpolymer employed is a binary interpolymer containing 30–85 mol percent butadiene.

8. A method for protecting steel surfaces which comprises applying to a steel surface to be protected a protective coating composition comprising an aqueous solution of a binary mixture of film-forming polymers and heating the coated surface to a temperature to at least 140° F. for a time sufficient to inter-react the film-forming polymers; the binary mixture of film-forming polymers employed consisting of 10–90 parts of (1) a water-soluble salt formed between a volatile nitrogenous base and an interpolymer of monomers consisting essentially of a conjugated 1,3-diene of the group consisting of butadiene, isoprene, piperylene and 2,3-dimethylbutadiene and an acidic monomer of the group consisting of acrylic acid, methacrylic acid and mixtures thereof, said interpolymer containing at least 25 mol percent of the conjugated 1,3-diene and 15–70 mol percent of the acidic monomer, the volatile nitrogenous base employed having an atmospheric boiling point not substantially higher than about 175° C., and 90–10 parts of (2) a water-soluble aminoplast of the group consisting of (a) water-soluble formaldehyde condensates of urea, thiourea, aminotriazines and mixtures thereof and (b) water-soluble ethers of such formaldehyde condensates.

9. In the method for protecting steel surfaces in which a primer coat of a resin is applied to a steel surface and a finish coat of an alkyd resin is applied upon said primer coat and cured; the improvement which comprises applying the primer coat to the steel surface to be protected by the method of claim 8.

References Cited in the file of this patent

UNITED STATES PATENTS

| | | |
|---|---|---|
| 2,317,725 | Billig | Apr. 27, 1943 |
| 2,469,408 | Powers et al. | May 10, 1949 |
| 2,604,668 | Miller et al. | July 29, 1952 |
| 2,626,936 | Hahn | Jan. 27, 1953 |
| 2,698,239 | Alles et al. | Dec. 28, 1954 |
| 2,734,831 | Larsson | Feb. 14, 1956 |
| 2,774,703 | Reynolds | Dec. 18, 1956 |
| 2,787,603 | Sanders | Apr. 2, 1957 |

UNITED STATES PATENT OFFICE
CERTIFICATE OF CORRECTION

Patent No. 2,952,564            September 13, 1960

Nello R. Traverso

It is hereby certified that error appears in the printed specification of the above numbered patent requiring correction and that the said Letters Patent should read as corrected below.

Column 5, line 15, for "larger" read -- large --; line 18, for "from" read -- in --; line 28, for "derivatives for" read -- derivatives of --; column 6, line 30, for "mixture" read -- mixtures --.

Signed and sealed this 11th day of April 1961.

(SEAL)
Attest:
ERNEST W. SWIDER
Attesting Officer

ARTHUR W. CROCKER
Acting Commissioner of Patents